United States Patent
Morimoto

(10) Patent No.: US 11,595,886 B2
(45) Date of Patent: Feb. 28, 2023

(54) ELECTRONIC APPARATUS AND COMMUNICATION SYSTEM FOR WIRELESS COMMUNICATION BASED ON FREQUENCY INFORMATION

(71) Applicant: SEIKO EPSON CORPORATION, Tokyo (JP)

(72) Inventor: Keiichi Morimoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 90 days.

(21) Appl. No.: 17/211,492

(22) Filed: Mar. 24, 2021

(65) Prior Publication Data

US 2021/0306945 A1 Sep. 30, 2021

(30) Foreign Application Priority Data

Mar. 27, 2020 (JP) .............................. JP2020-057359

(51) Int. Cl.
*G06F 15/00* (2006.01)
*G06F 3/12* (2006.01)
*G06K 1/00* (2006.01)
*H04W 48/20* (2009.01)
*H04W 48/16* (2009.01)
*H04W 84/12* (2009.01)

(52) U.S. Cl.
CPC .......... *H04W 48/20* (2013.01); *G06F 3/1203* (2013.01); *G06F 3/1236* (2013.01); *G06F 3/1292* (2013.01); *H04W 48/16* (2013.01); *H04W 84/12* (2013.01)

(58) Field of Classification Search
CPC .... G06F 3/1203; G06F 3/1236; G06F 3/1292; H04W 48/20; H04W 48/16; H04W 84/12
USPC ................................ 358/1.15, 1.14, 1.13, 1.1
See application file for complete search history.

(56) References Cited

U.S. PATENT DOCUMENTS

2019/0297628 A1* 9/2019 Kato .................. H04W 72/0453
2021/0282075 A1* 9/2021 Gwak .................... H04W 88/06
2022/0190646 A1* 6/2022 Park ........................ H02J 50/12

FOREIGN PATENT DOCUMENTS

JP 2004357082 A 12/2004

* cited by examiner

*Primary Examiner* — Douglas Q Tran
(74) *Attorney, Agent, or Firm* — Chip Law Group

(57) ABSTRACT

An electronic apparatus includes a wireless communication section configured to perform wireless communication and a processing section configured to perform communication control for the wireless communication section. The processing section performs control for causing the wireless communication section to operate as an internal access point that acquires, from a terminal device having a history of connecting to an external access point, through the wireless communication section, frequency information used for the connection to the external access point and performs the wireless communication using a frequency based on the acquired frequency information and, with the internal access point, directly connecting to the terminal device.

9 Claims, 6 Drawing Sheets

(A1: CONNECTION BETWEEN TERMINAL DEVICE AND EXTERNAL ACCESS POINT)

FREQUENCY INFORMATION Tch (A2: ACQUIRE FREQUENCY INFORMATION FROM TERMINAL DEVICE)

INTERNAL ACCESS POINT FOR PROVISIONAL CONNECTION (2.4 GHz BAND)

(A3: DIRECT CONNECTION)

INTERNAL ACCESS POINT(Ych)

FIG. 6

| IDENTIFICATION INFORMATION | FREQUENCY INFORMATION |
|---|---|
| SSID A | A ch |
| SSID B | B ch |
| SSID C | C ch |
| ⋮ | ⋮ |

ELECTRONIC APPARATUS AND COMMUNICATION SYSTEM FOR WIRELESS COMMUNICATION BASED ON FREQUENCY INFORMATION

The present application is based on, and claims priority from JP Application Serial Number 2020-057359, filed Mar. 27, 2020, the disclosure of which is hereby incorporated by reference herein in its entirety.

BACKGROUND

1. Technical Field

The present disclosure relates to an electronic apparatus, a communication system, and the like.

2. Related Art

When using a wireless apparatus, a user has to observe a radio wave frequency prescribed by a law in a region where the wireless apparatus is used. JP-A-2004-357082 (Patent Literature 1) discloses a method of switching, according to a region where the wireless apparatus is used, a radio wave frequency used in wireless communication.

In the method disclosed in Patent Literature 1, in order to specify the region where the wireless apparatus is used, it is necessary to mount a device such as a GPS (Global Positioning System) on the wireless apparatus. Therefore, in a wireless apparatus not mounted with a special device such as the GPS, it is difficult to switch a frequency adapted to a region where the wireless apparatus is used.

SUMMARY

An aspect of the present disclosure relates to an electronic apparatus including: a wireless communication section configured to perform wireless communication; and a processing section configured to perform communication control for the wireless communication section. The processing section performs control for acquiring, from a terminal device having a history of connecting to an external access point, through the wireless communication section, frequency information used for the connection to the external access point, causing the wireless communication section to operate as an internal access point that performs the wireless communication using a frequency based on the acquired frequency information, and, with the internal access point, directly connecting to the terminal device.

Another aspect of the present disclosure relates to a communication system including: an electronic apparatus; and a terminal device having a history of connecting to an external access point. The terminal device transmits, to the electronic apparatus, frequency information representing a frequency used for wireless communication with the external access point, and the electronic apparatus starts an internal access point that performs the wireless communication using the frequency based on the acquired frequency information and, with the internal access point, directly connects to the terminal device.

BRIEF DESCRIPTION OF THE DRAWINGS

FIG. 6 is an example of connection history information.

DESCRIPTION OF EXEMPLARY EMBODIMENTS

An embodiment is explained below. The embodiment explained below does not unduly limit contents described in the appended claims. Not all of components explained in this embodiment are always essential constituent elements.

1. System Configuration

Figure 1:
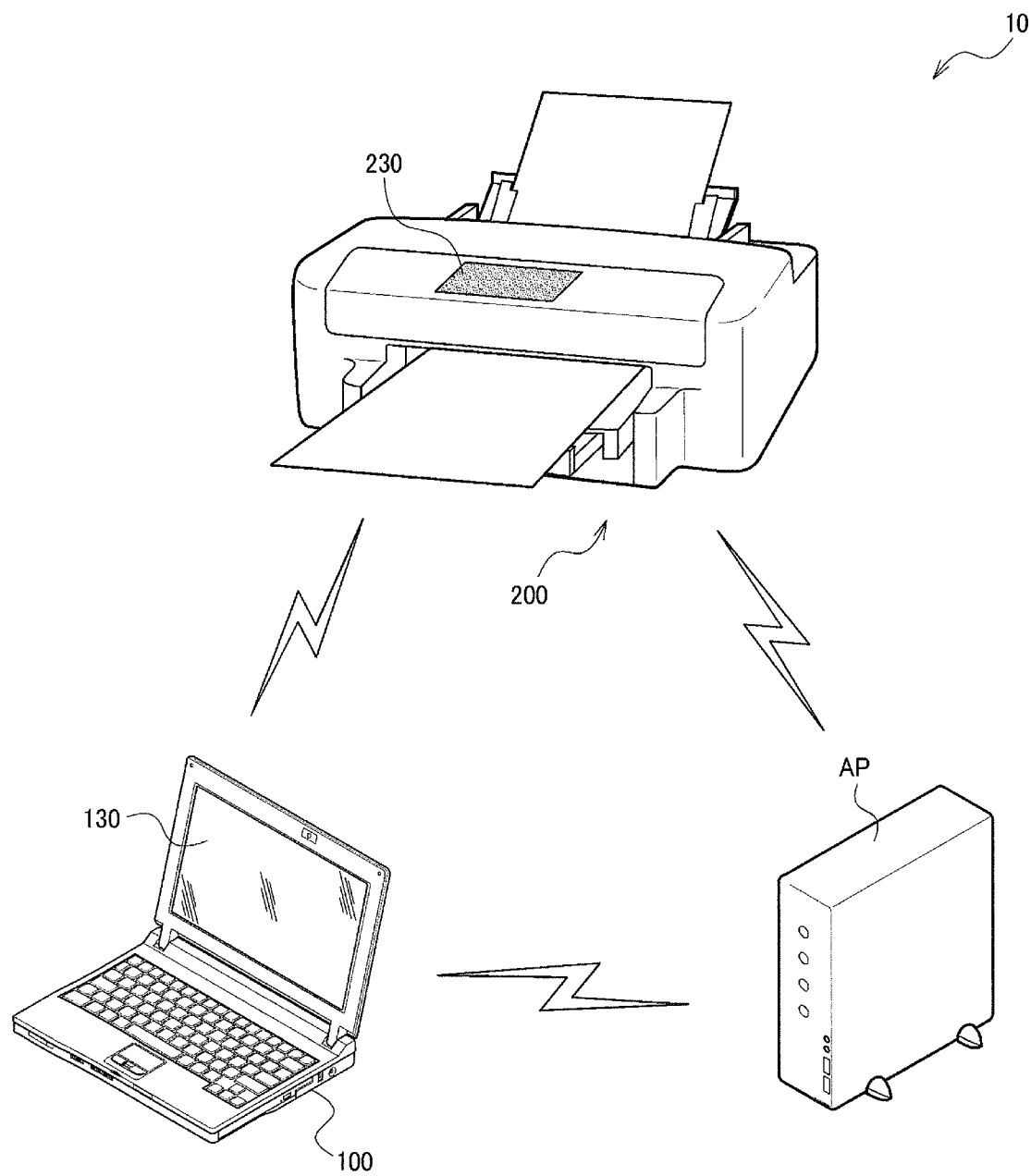
FIG. 1 is a configuration example of a communication system including a terminal device and an electronic apparatus.

FIG. 1 is a diagram schematically showing an example of a communication system 10 in this embodiment. The communication system 10 includes a terminal device 100 and an electronic apparatus 200.

The terminal device 100 is, for example, an information processing device such as a PC (Personal Computer). However, the terminal device 100 may be a portable terminal device such as a smartphone or a tablet terminal.

The electronic apparatus 200 is, for example, a printer. Alternatively, the electronic apparatus 200 may be a scanner, a facsimile apparatus, or a copying machine. The electronic apparatus 200 may be a multifunction peripheral (MFP) having a plurality of functions. A multifunction peripheral having a printing function is also an example of the printer. Alternatively, the electronic apparatus 200 may be a projector, a head-mounted display apparatus, a wearable apparatus, a biological information measurement apparatus, a robot, a video apparatus, a physical quantity measurement apparatus, or the like. The biological information measurement apparatus is a pulsimeter, a pedometer, an activity meter, or the like. The video apparatus is a camera or the like.

The communication system 10 is not limited to the configuration shown in FIG. 1. Various modified implementations such as addition of other constituent elements are possible. Modified implementations such as omission and addition of constituent elements are also possible in FIGS. 2 and 3 referred to below.

The terminal device 100 and the electronic apparatus 200 are capable of performing wireless communication. The wireless communication is communication using a Wi-Fi scheme. The Wi-Fi scheme is, for example, a wireless communication scheme based on an IEEE (Institute of Electrical and Electronics Engineers) 802.11 standard and a standard equivalent to the IEEE 802.11 standard.

For example, the terminal device 100 operates as a station. The terminal device 100 connects to an external access point AP and performs communication through the external access point AP. For example, the terminal device 100 performs communication with other apparatuses connecting to the external access point AP and communication with an external network such as the Internet.

The electronic apparatus 200 is capable of operating as a station and operating as an access point. For example, the electronic apparatus 200 connects to the external access point AP and performs communication through the external access point AP. However, as explained below, the electronic apparatus 200 in a method in this embodiment only has to be capable of executing scan processing for the external access point AP. It is not essential to establish connection to the external access point AP.

The electronic apparatus 200 may be capable of starting an internal access point. The internal access point may be described as software access point. The terminal device 100 connects to the internal access point of the electronic apparatus 200, whereby the terminal device 100 and the electronic apparatus 200 are directly connected.

Figure 2:
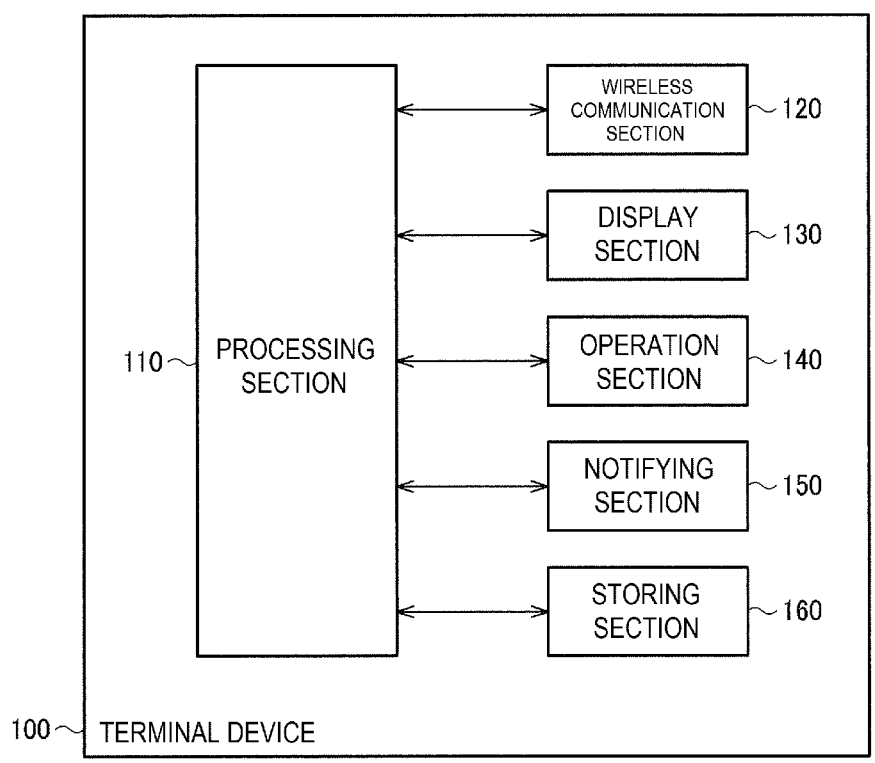
FIG. 2 is a configuration example of the terminal device.

FIG. 2 is a block diagram showing an example of the configuration of the terminal device 100. The terminal device 100 includes a processing section 110, a wireless communication section 120, a display section 130, an operation section 140, a notifying section 150, and a storing section 160.

The processing section 110 performs control of the wireless communication section 120, the display section 130, the operation section 140, the notifying section 150, and the storing section 160. The processing section 110 is specifically a processor or a controller.

The processing section 110 in this embodiment is configured by hardware explained below. The hardware can include at least one of a circuit that processes a digital signal and a circuit that processes an analog signal. For example, the hardware can be configured by one or a plurality of circuit devices or one or a plurality of circuit elements mounted on a circuit board. The one or the plurality of circuit devices are, for example, ICs (Integrated Circuits) or FPGAs (field-programmable gate arrays). The one or the plurality of circuit elements are, for example, resistors or capacitors.

The processing section 110 may be realized by a processor explained below. The terminal device 100 in this embodiment includes a memory that stores information and a processor that operates based on the information stored in the memory. The information is, for example, programs and various data. The processor includes hardware. As the processor, various processors such as a CPU (Central Processing Unit), a GPU (Graphics Processing Unit), and a DSP (Digital Signal Processor) can be used. The memory may be a semiconductor memory such as an SRAM (Static Random Address Memory) or a DRAM (Dynamic Random Access Memory), may be a register, may be a magnetic storage device such as a hard disk device, or may be an optical storage device such as an optical disk device. For example, the memory stores a command readable by a computer. The processor executes the command, whereby a function of the processing section 110 is realized as processing. The command may be a command of a command set configuring a program or may be a command for instructing a hardware circuit of the processor to perform operation. Further, the entire or a part of the processing section 110 may be realized by cloud computing.

The wireless communication section 120 is realized by at least one wireless communication device. The wireless communication device may be called wireless communication chip as well. The wireless communication device includes a wireless communication device that executes wireless communication conforming to a Wi-Fi standard. However, the wireless communication section 120 may include a wireless communication device that executes wireless communication conforming to a standard other than the Wi-Fi standard. The standard other than the Wi-Fi standard may be, for example, Bluetooth (registered trademark) and is BLE (Bluetooth Low Energy) in a narrow sense.

The display section 130 is configured by a display or the like that displays various kinds of information to a user. The operation section 140 is configured by buttons or the like that receive input operation from the user. The display section 130 and the operation section 140 may be integrally configured by, for example, a touch panel. The notifying section 150 performs notification to the user. For example, the notifying section 150 may be a speaker that performs notification by sound, may be a vibrating section that performs notification by vibration, or may be a combination of the speaker and the vibrating section.

The storing section 160 stores various kinds of information such as data and programs. The processing section 110 and the wireless communication section 120 operate using, for example, the storing section 160 as a work area. The storing section 160 may be a semiconductor memory such as an SRAM or a DRAM, may be a register, may be a magnetic storage device, or may be an optical storage device. The storing section 160 stores, for example, information concerning a connection history to the external access point AP.

Figure 3:
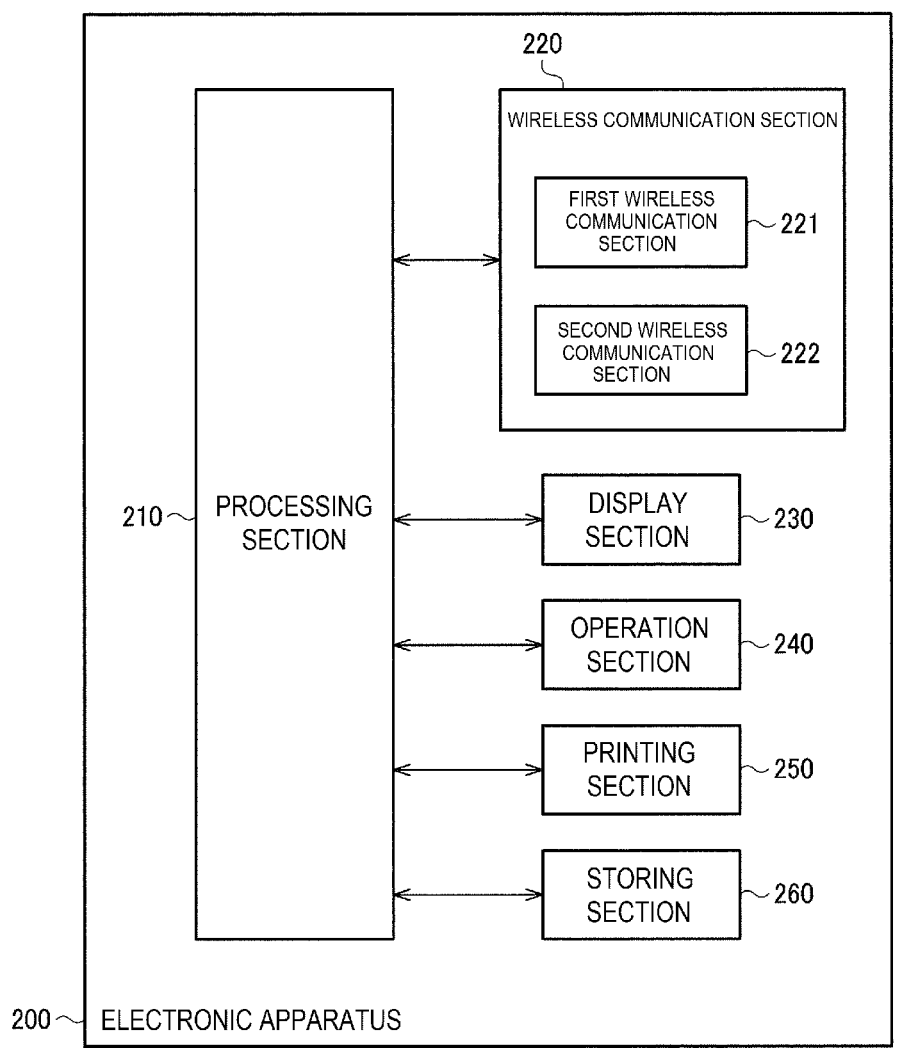
FIG. 3 is a configuration example of the electronic apparatus.

FIG. 3 is a block diagram showing an example of the configuration of the electronic apparatus 200. FIG. 3 shows the electronic apparatus 200 having a printing function. In the following explanation, an example in which the electronic apparatus 200 is a printer is explained as appropriate. However, as explained above, the electronic apparatus 200 can be extended to an apparatus other than the printer. The electronic apparatus 200 includes a processing section 210, a wireless communication section 220, a display section 230, an operation section 240, a printing section 250, and a storing section 260.

The processing section 210 controls the sections of the electronic apparatus 200. The sections of the electronic apparatus 200 are, for example, the wireless communication section 220, the storing section 260, and the printing section 250. For example, the processing section 210 can include a plurality of CPUs such as a main CPU and a sub-CPU. The main CPU performs control of the sections of the electronic apparatus 200 and overall control of the electronic apparatus 200. The sub-CPU is, for example, a CPU that performs communication control of the wireless communication section 220. Alternatively, when the electronic apparatus 200 is the printer, a CPU that performs various kinds of processing about printing may be further provided.

The processing section 210 in this embodiment is configured by hardware including at least one of a circuit that processes a digital signal and a circuit that processes an analog signal. For example, the hardware can be configured by one or a plurality of circuit devices or one or a plurality of circuit elements mounted on a circuit board.

The processing section 210 may be realized by a processor including hardware. The electronic apparatus 200 in this embodiment includes a memory that stores information and a processor that operates based on the information stored in the memory. The information is, for example, programs and various data. As the processor, various processors such as a CPU, a GPU, and a DSP can be used. The memory is a semiconductor memory, a register, a magnetic storage device, an optical storage device, and the like. For example, the memory stores a command readable by a computer. The processor executes the command, whereby a function of the processing section 210 is realized as processing. Further, the entire or a part of the processing section 210 may be realized by cloud computing.

The wireless communication section 220 may include a first wireless communication section 221 and a second wireless communication section 222. The first wireless communication section 221 performs first wireless communication, which is wireless communication at the time when the electronic apparatus 200 operates as a Wi-Fi station. For example, the first wireless communication section 221 executes wireless communication with the external access point AP. The second wireless communication section 222 performs second wireless communication, which is wireless communication at the time when the electronic apparatus 200 operates as a Wi-Fi access point. The second wireless communication section 222 executes direct connection to the terminal device 100 by starting the internal access point and receiving connection from the terminal device 100. Specifically, the wireless communication section 220 supports a Wi-Fi Direct (registered trademark) scheme.

The wireless communication section 220 is realized by at least one wireless communication device that executes wireless communication conforming to the Wi-Fi standard. The first wireless communication section 221 and the second wireless communication section 222 may be respectively realized by different wireless communication devices. Alternatively, the first wireless communication section 221 and the second wireless communication section 222 may be realized by a common wireless communication device. For example, one wireless communication device executes the first wireless communication and the second wireless communication in a time division manner, whereby the first wireless communication section 221 and the second wireless communication section 222 may be realized. The wireless communication section 220 may be capable of executing wireless communication conforming to a standard other than the Wi-Fi standard.

The display section 230 is configured by a display or the like that displays various kinds of information to the user. The operation section 240 is configured by buttons or the like that receives input operation from the user. The display section 230 and the operation section 240 may be integrally configured by, for example, a touch panel.

The printing section 250 includes a printing engine. The printing engine is a mechanical component that executes printing of an image on a printing medium. The printing engine includes, for example, a conveying mechanism, an ejection head of an inkjet scheme, and a driving mechanism for a carriage including the ejection head. The printing engine ejects, from the ejection head, ink to a printing medium conveyed by the conveying mechanism to print an image on the printing medium. The printing medium may be paper, may be cloth, or may be another medium. A specific configuration of the printing engine is not limited to the configuration illustrated above. The printing engine may perform printing with toner in an electrophotographic scheme.

The storing section 260 stores various kinds of information such as data and programs. The processing section 210 and the wireless communication section 220 operate using, for example, the storing section 260 as a work area. The storing section 260 may be a semiconductor memory, may be a register, may be a magnetic storage device, or may be an optical storage device. The storing section 260 may store data transmitted from the terminal device 100 by wireless communication. As explained below, the storing section 260 may store connection history information transmitted from the terminal device 100. When the electronic apparatus 200 is the printer, the storing section 260 may store data used for printing in the printing section 250.

When using a wireless apparatus, a user has to observe a radio wave frequency prescribed by a law in a region where the wireless apparatus is used. For example, channels in the wireless communication of the Wi-Fi scheme include channels in a 2.4 GHz band and channels in a 5 GHz band. The channels in the 2.4 GHz band include 1ch, 2ch, . . . , and 14ch. The channels in the 5 GHz band include 36ch, 40ch, 44ch, and 48ch in a 5.2 GHz band, 52ch, 56ch, 60ch, and 64ch in a 5.3 GHz band, 100ch, 104ch, . . . , and 140ch in a 5.6 GHz band, and 149ch, 153ch, . . . , and 165ch in a 5.8 GHz band. In the following explanation, the channels in the Wi-Fi scheme are used. However, the method in this embodiment is applicable to methods in which other wireless communication schemes and other frequency bands are used. In the following explanation, a radio wave frequency is simply described as frequency.

Channels that can be used in all countries and regions are present in the 2.4 GHz band. Specifically, 1ch to 11ch can be used in all the countries. However, in the case of the 5 GHz band, it depends on regions whether the channels can be used. Since the 5 GHz band is a frequency band used by various radars such as a weather radar, this is to avoid interference with the radars. For example, 36ch can be used in Japan but cannot be used in Nigeria. On the other hand, 149ch cannot be used in Japan but can be used in Nigeria. Some channels are permitted to be used indoors but are prohibited from being used outdoors. There are also channels that can be used but have to be automatically changed when a radar wave is detected.

In this way, there are restrictions by radio laws in countries and regions. Therefore, for example, a manufacturer of the electronic apparatus 200 manufactures and sells products after setting, for each of regions where the manufacturer sells the products, channels according to a law in the region. For example, in the example explained above, channels are set not to use 149ch for products shipped to Japan.

However, it is also conceivable that a user uses a purchased product abroad. In this case, in order to perform communication conforming to the radio laws, it is necessary to use a channel usable in all the countries. Otherwise, since it is likely that the radio laws cannot be observed, it is necessary to request the user not to use the purchased product abroad.

However, as explained above, the channel usable in all the countries is the channel in the 2.4 GHz band. In recent years, although communication in the 5 GHz band is requested because of congestion in a radio environment involved in an increase of wireless terminals, communication in the 5 GHz band is restricted in the use of the purchased product abroad.

In the method of related art disclosed in Patent Literature 1, a country and a region where a wireless apparatus is used are specified using the GPS or the like. Accordingly, in order to set a frequency adapted to the region where the wireless apparatus is used, it is necessary to mount an exclusive device on the wireless apparatus.

Figure 4:
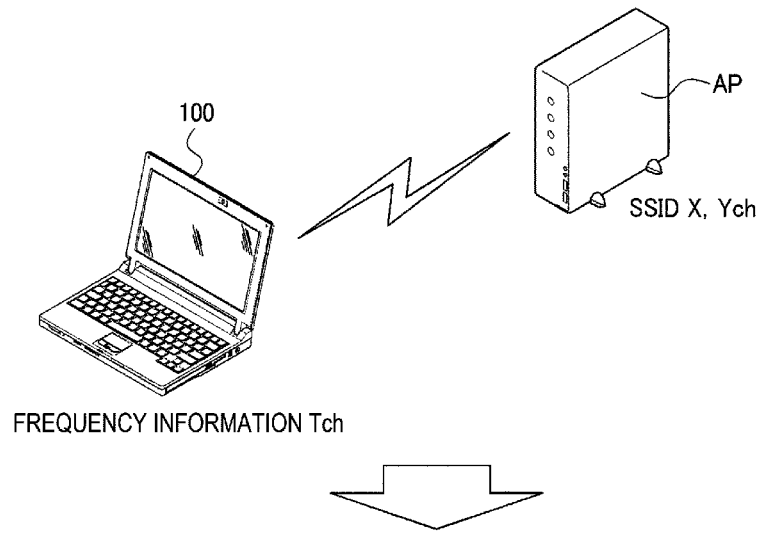
FIG. 4 is a schematic diagram for explaining processing in an embodiment.
Figure 4:
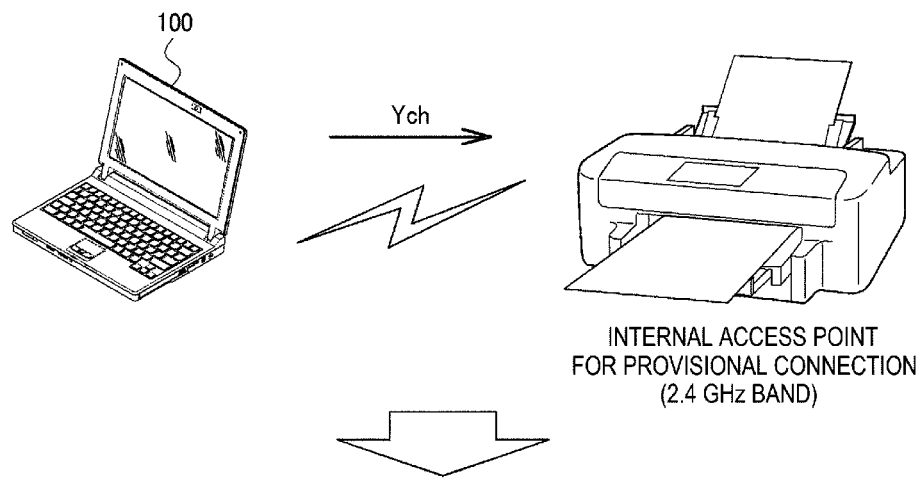
Figure 4:
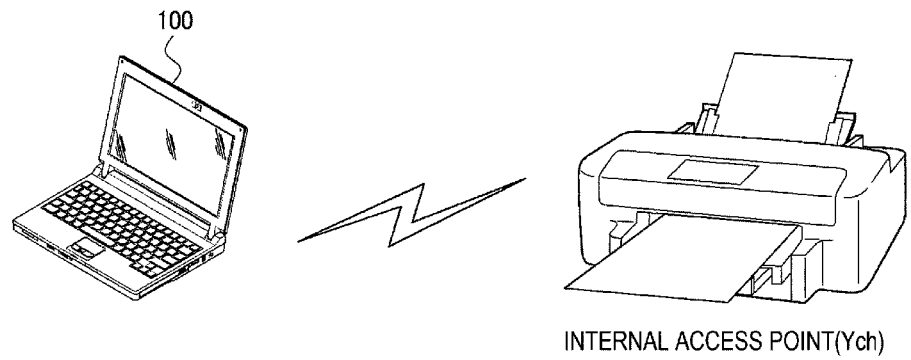

FIG. 4 is a schematic diagram for explaining the method in this embodiment. The method in this embodiment is a method for directly connecting the terminal device 100 and the electronic apparatus 200 as shown in A3. In a state in which the direct connection is established, for example, the electronic apparatus 200 performs processing for receiving a command for execution of a job from the terminal device 100 and executing the job. The electronic apparatus 200 is, for example, a printer. The job is, for example, a printing job. The printing job is information including image information to be printed and printing setting information. The printing setting information is information for specifying setting values about setting items such as a paper size, simplex/duplex, and color/monochrome.

As shown in A1 in FIG. 4, the terminal device 100 has a history of performing connection to the external access point AP before establishing direct connection to the electronic apparatus 200. At this time, the terminal device 100 stores frequency information of the external access point AP. For example, the terminal device 100 stores a channel of the external access point AP. The terminal device 100 may store identification information of the external access point AP. The identification information is, for example, an SSID (Service Set Identifier).

When the establishment of the direct connection between the terminal device 100 and the electronic apparatus 200 is attempted, first, as shown in A2, the electronic apparatus 200 acquires, from the terminal device 100, information concerning the channel of the external access point AP. At this time, for example, as explained below, the electronic apparatus 200 starts a second internal access point for provisional connection. The second internal access point is an internal access point, an SSID and a password of which are known for the terminal device 100. A generally usable channel in the 2.4 GHz band is used in the internal access point.

The electronic apparatus 200 starts an internal access point for regular connection using the acquired channel. As shown in A3, the electronic apparatus 200 performs direct connection to the terminal device 100 using the internal access point.

The electronic apparatus 200 in this embodiment includes, as shown in FIG. 3, the wireless communication section 220 that performs wireless communication and the processing section 210 that performs communication control for the wireless communication section 220. The processing section 210 acquires, from the terminal device 100 having the history of connecting to the external access point AP, through the wireless communication section 220, frequency information used for the connection to the external access point AP. The processing section 210 causes the wireless communication section 220 to operate as an internal access point that performs wireless communication using a frequency based on the acquired frequency information. The processing section 210 performs, with the internal access point, control for directly connecting to the terminal device 100.

The frequency information is, in a narrow sense, information for specifying a channel used for wireless communication. However, the frequency information only has to be information capable of specifying a frequency used for wireless communication and may be other information such as numerical value information of the frequency.

The terminal device 100 is assumed to be a device having a history of use in a present region where the electronic apparatus 200 is used. Accordingly, the frequency information acquired from the terminal device 100 has high probability of being usable in the present region where the electronic apparatus 200 is used. Consequently, even when the electronic apparatus 200 moves to a region different from a region where the electronic apparatus 200 was purchased or a region where the electronic apparatus 200 has been used, it is possible to suppress use at a frequency prohibited by a law. The electronic apparatus 200 in this embodiment only has to be capable of acquiring information from the terminal device 100 and does not need to be mounted with a device for detecting a position such as a GPS. As shown in A3 in FIG. 4, the terminal device 100 in this embodiment is an apparatus for which direct connection to the electronic apparatus 200 is established. Therefore, the terminal device 100 has high probability of performing provisional connection as shown in A2 and performing, with the provisional connection, transmission and reception of an SSID, a password, and the like necessary for regular connection. Accordingly, there is also an advantage that transmission and reception of frequency information in the provisional connection does not increase a processing load.

The method in this embodiment can be applied to the communication system 10 including the electronic apparatus 200 and the terminal device 100 having a connection history to the external access point AP. The terminal device 100 transmits, to the electronic apparatus 200, frequency information representing a frequency used for wireless communication with the external access point AP. The electronic apparatus 200 starts an internal access point that performs wireless communication using the frequency based on the acquired frequency information and, with the internal access point, directly connects to the terminal device 100.

2. Flow of Processing

Figure 5:
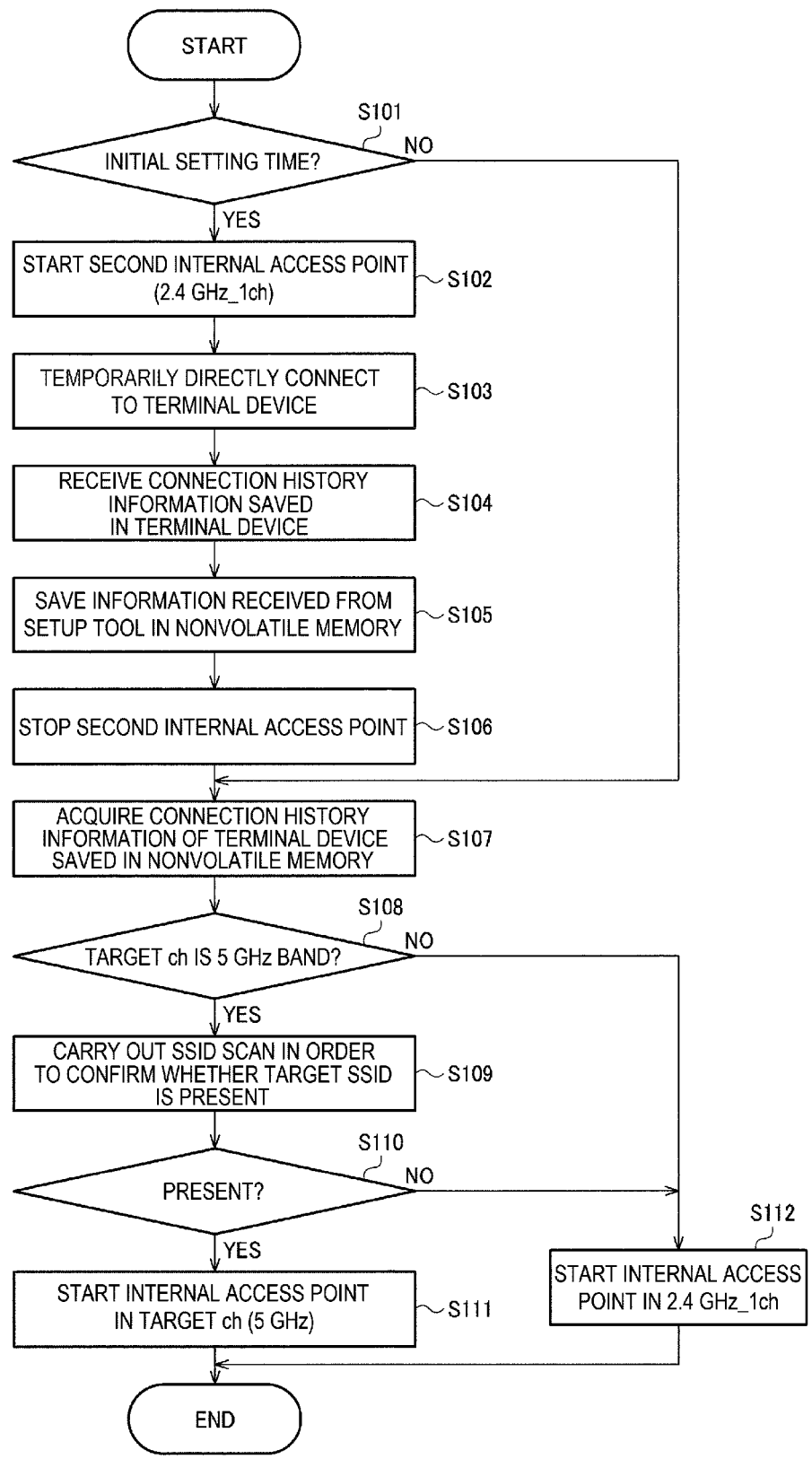
FIG. 5 is a flowchart for explaining processing in the embodiment.

FIG. 5 is a flowchart for explaining processing in this embodiment. The processing shown in FIG. 5 is processing for estimating a frequency having high probability of being usable. Estimation of a usable frequency is necessary, for example, when the electronic apparatus 200 is moved abroad. If considering that there are different frequencies that can be used indoors and outdoors as explained above, it is also desirable to estimate a usable frequency when the electronic apparatus 200 is moved from indoors to outdoors. However, since the electronic apparatus 200 in this embodiment is assumed to be not mounted with a device such as a GPS, it is not easy to automatically detect the movement described above. Accordingly, for example, the electronic apparatus 200 may execute the processing shown in FIG. 5 at every operation start time. Alternatively, the electronic apparatus 200 may periodically execute the processing shown in FIG. 5 using a timer or the like. The operation start time may be timing when a power supply of the electronic apparatus 200 is turned on or may be timing when the electronic apparatus 200 is restored from a sleep state. By estimating a usable frequency at a high frequency, it is possible to prevent a frequency prohibited by a law from being used by mistake.

When the processing in FIG. 5 is started, first, the processing section 210 of the electronic apparatus 200 determines whether to perform initial setting (step S101). For example, at an initial use time of the electronic apparatus 200, the user executes initial setting operation using the operation section 240 of the electronic apparatus 200. When receiving the initial setting operation, the processing section 210 determines to perform the initial setting.

At the initial use time of the electronic apparatus 200, the user performs setup start operation using the terminal device 100. For example, the storing section 160 of the terminal device 100 stores a setup tool, which is application software for performing setup. The setup tool may be provided by a medium such as an optical disk. The processing section 110 of the terminal device 100 operates according to the setup tool to thereby execute setup for directly connecting the terminal device 100 and the electronic apparatus 200.

When the initial setting is performed (Yes in step S101), the wireless communication section 220 of the electronic apparatus 200 starts the second internal access point for provisional connection (step S102). At this stage, it is unclear which frequency is usable. Accordingly, the second internal access point is set to a frequency generally usable in a wide region. For example, a channel of the second internal access point is set to 1ch in the 2.4 GHz band. The second internal access point is an access point, an SSID and a password of which are fixed.

The setup tool retains the SSID and the password of the second internal access point for provisional connection. The wireless communication section 120 of the terminal device 100 connects to the second internal access point using the SSID and the password. The wireless communication section 220 of the electronic apparatus 200 receives connection from the terminal device 100, whereby the terminal device 100 and the electronic apparatus 200 are temporarily directly connected (step S103).

The storing section 160 of the terminal device 100 stores connection history information including the frequency information of the external access point AP having a history of connection in the past. As explained above, the frequency information is, in a narrow sense, information for specifying a channel.

FIG. 6 is an example of the connection history information. For example, the storing section 160 stores, as the connection history information, information in which an SSID of the external access point AP having a connection history and a channel used for the connection are associated. The processing section 110 transmits the connection history information to the electronic apparatus 200 using the direct connection by the second internal access point. The wireless communication section 220 receives the connection history information (step S104).

The processing section 210 of the electronic apparatus 200 saves the connection history information received by the wireless communication section 220 in the storing section 260 (step S105). The connection history information stored by the storing section 260 may have the same form as the form of the information stored by the storing section 160 of the terminal device 100. Alternatively, the processing section 210 of the electronic apparatus 200 may perform some processing on information acquired from the terminal device 100 and store a processing result in the storing section 260 as the connection history information. It is undesirable that the connection history information is lost by power-off of the electronic apparatus 200. Accordingly, for example, the storing section 260 storing the connection history information is a nonvolatile memory. After the processing in step S105, the second wireless communication section 222 stops the second internal access point (step S106).

In the case of No in step S101, the processing in steps S102 to S106 is omitted. That is, the connection history information acquired from the terminal device 100 by the wireless communication section 220 in the past and stored by the storing section 260 is used for the processing after timing other than an initial setting time. The communication with the terminal device 100 using the second internal access point is unnecessary at the timing other than the initial setting time. Therefore, as explained above, even if the processing shown in FIG. 5 is executed at a high frequency, it is possible to suppress a processing load applied to the electronic apparatus 200.

Subsequently, the processing section 210 of the electronic apparatus 200 acquires the connection history information stored in the storing section 260 (step S107). The processing section 210 determines, based on the acquired connection history information, whether a channel in the 5 GHz band can be used in a present region.

First, the processing section 210 determines whether frequency represented by the frequency information of the connection history information is in the 5 GHz band (step S108). Specifically, the processing section 210 determines whether the channel is 36ch or higher.

When a channel in the 5 GHz band is included in the connection history information, the processing section 210 determines whether the external access point AP having an SSID associated with the channel is present around the electronic apparatus 200. In the following explanation, the channel in the 5 GHz band included in the connection history information is described as target channel and the SSID associated with the target channel is described as target SSID. When a plurality of target SSIDs are present, the processing section 210 and the wireless communication section 220 execute the processing in steps S109 and S110 about the respective target SSIDs.

The wireless communication section 220 executes SSID scan in the target channel (step S109). However, it is not decided whether a channel included in the connection history information can be used in the present region where the electronic apparatus 200 is used. Accordingly, in order to prevent a radio wave in the channel from being output, the SSID scan in step S109 is performed by passive scan.

The processing section 210 determines, based on a result of the SSID scan in step S109, whether the target SSID is present (step S110). When the target SSID is present in step S110, the target channel and the target SSID included in the connection history information are information concerning the external access point AP already used in the present region where the electronic apparatus 200 is used. Therefore, the target channel is considered to be not prohibited from being used in the present region. Accordingly, the processing section 210 performs processing for starting the internal access point in the target channel associated with the target SSID (step S111). Note that, although not shown in FIG. 5, the electronic apparatus 200 transmits an SSID and a password of the internal access point to the terminal device 100 in steps S102 to S106. The terminal device 100 performs, using the SSID and the password, processing for connecting to the internal access point started in step S111.

On the other hand, in the case of No in step S108, a channel in the 5 GHz band is absent in the connection history information. It is difficult to estimate information concerning the 5 GHz band usable in the present region. Accordingly, the processing section 210 starts the internal access point at a frequency generally usable in a wide region. For example, a channel of the internal access point is set to 1ch in the 2.4 GHz band (step S112). In step S112, as in step S111, for example, transmission and reception of the SSID and the password of the internal access point is performed using, for example, temporary direct connection performed using the second internal access point for provisional connection.

In the case of No in step S110, the terminal device 100 has a history of connecting to the external access point AP using a channel in the 5 GHz band in the past but cannot specify whether the history is a history of use in the present region. That is, it is unknown whether the target channel in the present region is usable. Therefore, the processing section 210 executes the processing in step S112.

As explained above, the processing section 210 performs processing for acquiring the identification information of the external access point AP from the terminal device 100 through the wireless communication section 220. The identification information is, for example, an SSID but may be other information capable of specifying the external access point AP such as a MAC address or an IP address. Specifically, as shown in step S104, the wireless communication section 220 receives the connection history information including the identification information and the frequency information from the terminal device 100. When an external access point corresponding to the identification information is found by the passive scan by the wireless communication section 220 (Yes in step S110), the processing section 210 causes the wireless communication section 220 to operate as an internal access point that performs wireless communication using a frequency based on the acquired frequency information (step S111). The processing section 210 performs, using the internal access point, control for directly connecting to the terminal device 100.

Probability that the frequency information included in the connection history information can be used in the present region where the electronic apparatus 200 is used is high. However, it is not guaranteed that the frequency information can always be used. This is because the terminal device 100 has a history of being used in a region different from the present region where the electronic 200 is used and it is likely that the connection history information is information representing a connection history in the different region. With the method in this embodiment, it is confirmed whether the external access point AP corresponding to the connection history information is present around the electronic apparatus 200. Therefore, it is possible to appropriately determine whether the frequency information acquired from the terminal device 100 is information that can be used in the present region where the electronic apparatus 200 is used. However, since it is unknown whether the channel included in the connection history information can be used, it is inappropriate to output a radio wave in the channel for confirmation of the use. In that regard, by using the passive scan for a search for the external access point AP, the electronic apparatus 200 is capable of performing the SSID scan without outputting a radio wave.

The processing section 210 acquires frequency information from the terminal device 100 by causing the wireless communication section 220 to operate as a second internal access point in a first frequency band as shown in step S102. The processing section 210 performs control for directly connecting to the terminal device 100 by causing, based on the acquired frequency information, the wireless communication section 220 to operate as an internal access point in a second frequency band different from the first frequency band as shown in step S111. For example, the electronic apparatus 200 transmits information for connecting to the internal access point to the terminal device 100 using temporary direct connection by the second internal access point The information is, for example, an SSID and a password of the internal access point.

As explained above, the electronic apparatus 200 in this embodiment performs the processing for estimating a usable channel by acquiring the connection history information from the terminal device 100. However, to perform the processing, it is necessary to establish wireless connection between the electronic apparatus 200 and the terminal device 100 using a channel usable in the region where the electronic apparatus 200 is used. It is possible to appropriately transmit and receive the connection history information by using the second internal access point in the first frequency band.

The first frequency band is the 2.4 GHz band. The second frequency band is the 5 GHz band. The 2.4 GHz band includes a channel usable in a wide region. For example, it is assumed that 1ch to 11ch are usable in all countries and regions. Therefore, the 2.4 GHz band is a frequency band suitable for transmission and reception of the connection history information.

On the other hand, communication quality is higher in the 5 GHz band than in the 2.4 GHz band. A general-purpose channel usable in all the countries is absent in the 5 GHz band in the present situation. Therefore, a frequency band having more meaning to be set as a target of determination about whether a channel is usable is the 5 GHz band. As explained above, the generally usable channel is present in the 2.4 GHz band. Therefore, necessity of determining whether a channel in the 2.4 GHz band is usable is lower compared with determination in the 5 GHz band.

The electronic apparatus 200 may include the storing section 260 that stores, as the connection history information, information including the frequency information of the external access point AP. As shown in FIG. 6, the connection history information may include the identification information of the external access point AP. The processing section 210 causes the wireless communication section 220 to operate as an internal access point that performs wireless communication using a frequency based on the frequency information of the connection history information stored in the storing section 260 as shown in step S107.

The connection history information is specifically information acquired from the terminal device 100 and may be information acquired immediately before the processing in step S107. For example, the electronic apparatus 200 performs the processing in step S107 continuously from the processing insteps S102 to S106. The connection history information may be information acquired at timing further in the past than the processing in step S107 by a predetermined time or more. For example, when the processing shown in FIG. 5 is periodically repeated, connection history information acquired at an initial execution time of the processing shown in FIG. 5 is used in the processing shown in FIG. 5 in second and subsequent times.

The processing section 210 may execute one processing of first processing and second processing explained below. The first processing is processing for causing the wireless communication section 220 to operate as an internal access point that acquires frequency information from the terminal device 100 and performs wireless communication using a frequency based on the acquired frequency information. The second processing is processing for causing the wireless communication section 220 to operate as an internal access point that performs wireless communication using the frequency based on the frequency information of the connection history information stored in the storing section 260 without acquiring frequency information from the terminal device 100. More specifically, based on a given condition, the processing section 210 may switch whether to perform the processing in step S107 after acquiring the connection history information from the terminal device 100 or perform the processing in step S107 without acquiring the connection history information from the terminal device 100. The given condition is, for example, whether it is the initial setting time as shown in step S101. More specifically, the processing section 210 determines, based on whether the initial setting operation by the user is received, whether to acquire the connection history information from the terminal device 100. The initial setting is not limited to setting performed when the electronic apparatus 200 is used for the first time. For example, the initial setting may be executed at any timing based on user operation.

In order to transmit the connection history information to the electronic apparatus 200, the terminal device 100 needs to retain an SSID and a password of a second internal access point for transmission and reception. For example, the user needs to start a setup tool or the like in the terminal device 100. When using communication other than communication performed using the second internal access point, it is also necessary to establish connection for transmitting and receiving the connection history information. It is necessary to start a setup tool that specifies processing for establishing the connection. When the processing shown in FIG. 5 is performed, a user burden is large if the user starts the setup tool every time.

In that regard, processing necessary for information acquisition from the terminal device 100 can be omitted by retaining the connection history information on the electronic apparatus 200 side. Therefore, it is possible to reduce the user burden and reduce a processing load on the terminal device 100 and the electronic apparatus 200.

In the above explanation, the usable frequency is limited based on the law. However, a legal restriction is not limited to this. Usable radio wave intensity is also limited according to a country or a region. Accordingly, when operating as the internal access point that performs the wireless communication using the frequency based on the frequency information, the wireless communication section 220 may perform the wireless communication at radio wave intensity equal to or lower than given intensity. The given intensity represents, for example, an upper limit value of radio wave intensity usable in a wide region. By setting the radio wave intensity to the given intensity or less, it is possible to suppress radio wave transmission at radio wave intensity prohibited from being used.

The embodiment is explained in detail above. Those skilled in the art will be able to easily understand that many modifications are possible without substantially departing from the new matters and the effects of the embodiment. Therefore, such modifications are assumed to be included in the scope of the present disclosure. For example, a term described together with a different term in a broader sense or a different synonymous term at least once in the specification or the drawings can be replaced with the different term in any part in the specification or the drawings. All combinations of the embodiment and the modifications are also included in the scope of the present disclosure. The configurations, the operations, and the like of the electronic apparatus, the terminal device, the communication system, and the like are not limited to those explained in the embodiment. Various modified implementations of the configurations, the operations, and the like are possible.

What is claimed is:

1. An electronic apparatus comprising:
   a wireless communication section configured to perform wireless communication; and
   a processing section configured to perform communication control for the wireless communication section, wherein
   the processing section performs control for acquiring, from a terminal device having a history of connecting to an external access point, frequency information used for the connection to the external access point by the terminal device, causing the wireless communication section to operate as an internal access point that performs the wireless communication using a frequency based on the acquired frequency information, and, with the internal access point, directly connecting to the terminal device.

2. The electronic apparatus according to claim 1, wherein the processing section acquires identification information of the external access point from the terminal device through the wireless communication section and, when the external access point corresponding to the identification information is found by passive scan by the wireless communication section, causes the wireless communication section to operate as the internal access point that performs the wireless communication using the frequency based on the acquired frequency information.

3. The electronic apparatus according to claim 1, further comprising a storing section configured to store, as connection history information, information including the frequency information of the external access point, wherein
   the processing section causes the wireless communication section to operate as the internal access point that performs the wireless communication using the frequency based on the frequency information of the connection history information stored in the storing section.

4. The electronic apparatus according to claim 3, wherein the processing section preforms one processing of processing for causing the wireless communication section to operate as the internal access point that acquires the frequency information from the terminal device and performs the wireless communication using the frequency based on the acquired frequency information and processing for causing the wireless communication section to operate as the internal access point that performs, without acquiring the frequency information from the terminal device, the wireless communication using the frequency based on the frequency information of the connection history information stored in the storing section.

5. The electronic apparatus according to claim 1, wherein the processing section acquires the frequency information from the terminal device by causing the wireless communication section to operate as a second internal access point in a first frequency band and causes, based on the acquired frequency information, the wireless communication section to operate as the internal access point in a second frequency band different from the first frequency band.

6. The electronic apparatus according to claim 5, wherein the first frequency band is a 2.4 GHz band, and
   the second frequency band is 5 GHz band.

7. The electronic apparatus according to claim 1, wherein the frequency information is information for specifying a channel used for the wireless communication.

8. The electronic apparatus according to claim 1, wherein the wireless communication section performs the wireless communication at radio wave intensity equal to or lower than given intensity when operating as the internal access point that performs the wireless communication using the frequency based on the frequency information.

9. A communication system comprising:
   an electronic apparatus; and
   a terminal device having a history of connecting to an external access point, wherein
   the terminal device transmits, to the electronic apparatus, frequency information representing a frequency used for wireless communication with the external access point, and
   the electronic apparatus acquires, from the terminal device having the history of connecting to the external access point, the frequency information used for connection to the external access point by the terminal device, starts an internal access point that performs the wireless communication using the frequency based on the acquired frequency information and, with the internal access point, directly connects to the terminal device.

* * * * *